US012672639B2

(12) United States Patent
Gittelman

(10) Patent No.: US 12,672,639 B2
(45) Date of Patent: Jul. 7, 2026

(54) TEAR-RESISTANT DOG CHEW TOY AND METHOD OF MAKING THE SAME

(71) Applicant: Pack Leader Dog Toys, LLC, Cincinnati, OH (US)

(72) Inventor: Joshua M. Gittelman, Cincinnati, OH (US)

(73) Assignee: Pack Leader Dog Toys, LLC, Cincinnati, OH (US)

( * ) Notice: Subject to any disclaimer, the term of this patent is extended or adjusted under 35 U.S.C. 154(b) by 472 days.

(21) Appl. No.: 18/224,713

(22) Filed: Jul. 21, 2023

(65) Prior Publication Data

US 2025/0024815 A1 Jan. 23, 2025

(51) Int. Cl.
*A01K 15/02* (2006.01)

(52) U.S. Cl.
CPC ................................... *A01K 15/026* (2013.01)

(58) Field of Classification Search
CPC .............. A01K 15/026; A01K 15/0258; A01K 15/025; A01K 15/0201; A01K 15/0252; A01K 15/0257
See application file for complete search history.

(56) References Cited

U.S. PATENT DOCUMENTS

| | | | | | |
|---|---|---|---|---|---|
| 2,185,547 | A | * | 1/1940 | Fowler | A01K 15/026 |
| | | | | | 119/709 |
| 2,291,155 | A | * | 7/1942 | Gartz | A47C 27/006 |
| | | | | | 5/636 |
| 4,742,799 | A | * | 5/1988 | Schlitz | A01K 15/025 |
| | | | | | 119/707 |
| 5,299,335 | A | * | 4/1994 | Ivester | A47C 27/12 |
| | | | | | 5/641 |
| 5,685,257 | A | * | 11/1997 | Feibus | A01K 1/0353 |
| | | | | | 5/652 |
| 6,014,950 | A | * | 1/2000 | Rogers | A01K 15/026 |
| | | | | | 119/710 |
| 7,870,839 | B2 | * | 1/2011 | Sacra | A01K 15/025 |
| | | | | | 119/709 |
| 2002/0187718 | A1 | * | 12/2002 | Ritchey | A63H 3/003 |
| | | | | | 446/71 |
| 2004/0211225 | A1 | * | 10/2004 | Dickerson | D04B 21/18 |
| | | | | | 66/142 |

(Continued)

FOREIGN PATENT DOCUMENTS

| | | | | | |
|---|---|---|---|---|---|
| CA | | 2688885 A1 | * | 5/2011 | ......... A01K 15/0258 |
| WO | WO-2009059280 A1 | | * | 5/2009 | ........... B32B 29/007 |

*Primary Examiner* — Katelyn T Truong
(74) *Attorney, Agent, or Firm* — Caesar Rivise, PC

(57) ABSTRACT

A tear-resistant chew toy for dogs and a method of making the toy. The toy includes a first and second similarly constructed panel assemblies, each of which includes a quilted fabric panel surrounded by a chew guard in the form of a webbing of ultra-high molecular weight polyethylene (UHMWPE) fabric. Overlapping portions of the chew guard are secured to the panel by a zig-zagging stitch pattern formed of UHMWPE thread. The individual stitches of the pattern extend at an acute angle to a radius of the fabric panel and generally parallel to the direction that dogs use their back molar teeth to gnaw on a chew guard. The panel assemblies are secured together by a stitch line also formed of UHMWPE thread to form an internal chamber in which a soft resilient stuffing and an audible squeaker are located.

20 Claims, 2 Drawing Sheets

(56)        References Cited

U.S. PATENT DOCUMENTS

| | | | | |
|---|---|---|---|---|
| 2009/0199784 A1* | 8/2009 | Oblack | ............... | A01K 15/025 |
| | | | | 119/707 |
| 2016/0236378 A1* | 8/2016 | Croughwell | ......... | A01K 15/025 |
| 2019/0297848 A1* | 10/2019 | Gao | .................... | A01K 15/025 |

* cited by examiner

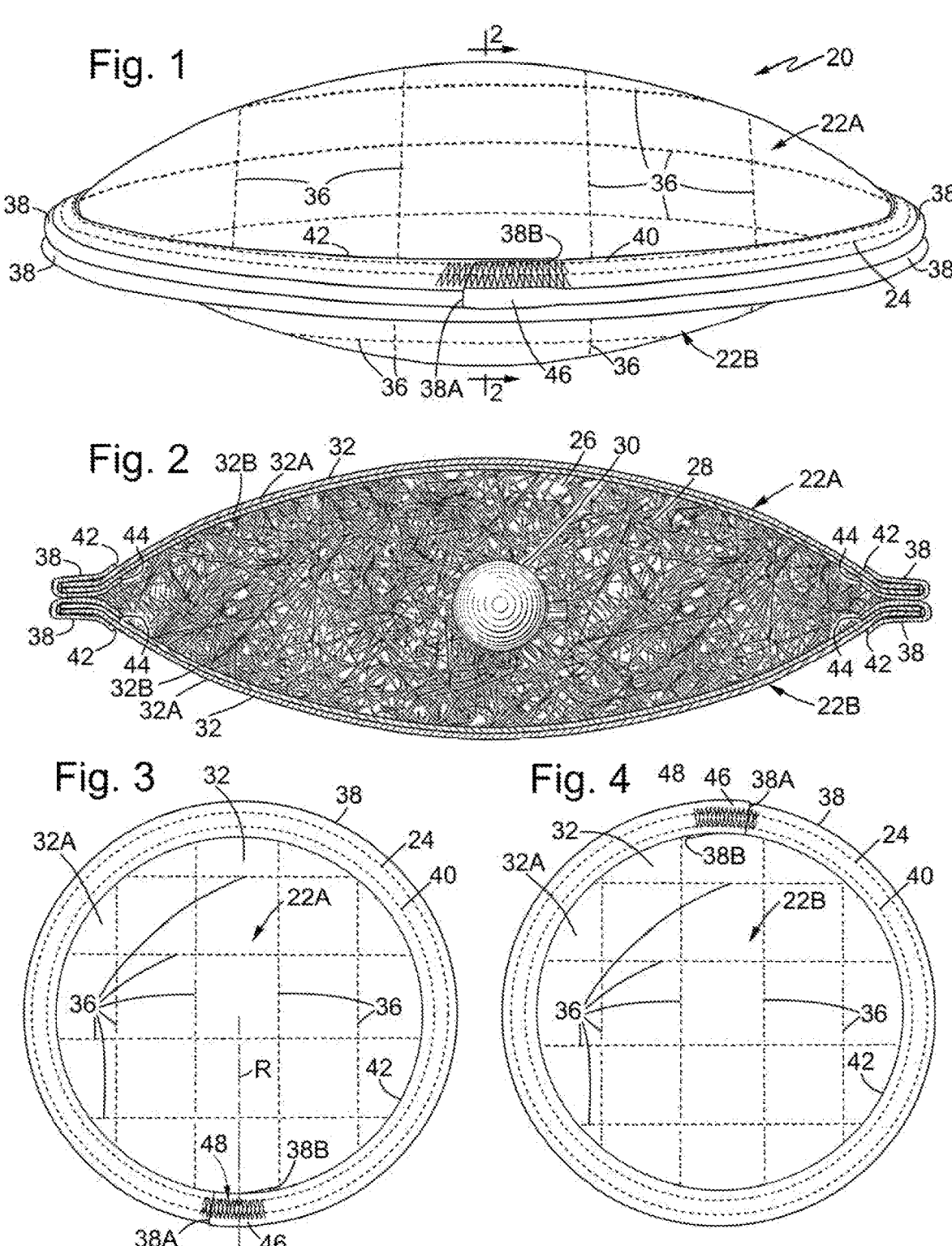

TEAR-RESISTANT DOG CHEW TOY AND METHOD OF MAKING THE SAME

FIELD OF THE INVENTION

This invention relates generally to animal toys and more particularly to soft or plush chew toys for dogs which are resistant to tearing or damage incurred by the dog chewing on the toy.

BACKGROUND OF THE INVENTION

Dog owners commonly provide their pets with chew toys in the interest of enhancing their pet's life experience, enjoyment, and entertainment. Those chew toys come in various forms, the two most common are hard plastic or rubber toys and soft fabric or plush toys.

Hard plastic and rubber toys may seem like a viable solution for dogs who are tough chewers; however, these types of toys are inherently less engaging for pets. Plush toys, particularly those with a built-in squeaker, seem to be the most engaging type of toy because they most closely resemble an animal being hunted in the wild and activate a pet's intrinsic prey drive to chew. Although plush toys are ideal for keeping pets engaged, dog owners with tough chewers typically avoid these types of products because they are easily destroyed within a single playtime session or within the same day a purchase is made. It has been found that the edges along the stitched seams of any plush dog toy are the most vulnerable weak point since tough chewers are easily able to destroy the exposed threads that hold these types of toys together. The individual threads holding plush toys together are the weakest point of any sewn product since they can easily be picked at one by one until the sewn together fabric components are no longer being held together. After the edge of any toy is compromised, the entire toy becomes unusable. At this point, any dog is easily able to get to and swallow the stuffing material which provides the toy its 3-dimensional appearance and may also swallow the squeaker or any part thereof, either of which occurrences are to be avoided in the interest of maintaining the dog's health and well-being.

To solve that problem companies involved in the durable plush toy market began to implement a sewn-on chew guard comprised of webbing material that is sewn around the circumference or periphery of their plush chew toys. This change was made to prevent any thread material from being exposed along the edges of the stitched seam. Despite this industry-wide change, there is still an overwhelming amount of evidence that tough chewers are tearing apart these toys starting from the edge for which the webbing chew guard had been designed to protect.

Accordingly, a need exists for chew toys for dogs which overcome the disadvantages of the prior art. The subject invention addresses that need and does so by creating an extremely durable, but also engaging plush dog toy that provides the most versatile playtime experience. Accordingly, with the subject invention dog owners with tough chewers will no longer have to sacrifice high playtime engagement for durability or durability for high playtime engagement.

BRIEF SUMMARY OF THE INVENTION

One aspect of this invention is a tear-resistant chew toy for a dog having destructive back molar teeth. The tear-resistant chew toy comprises a first panel assembly, a second panel assembly, a first line of stitches, a second line of stitches and a soft and resilient stuffing material. The first panel assembly comprises a first panel and a first chew guard. The first panel is of a predetermined shape having a peripheral edge and a radius extending to the peripheral edge, with the first panel being formed of a high-tenacity woven nylon or polyester bag fabric. The first chew guard comprises a webbing of ultra-high molecular weight polyethylene (UHMWPE) fabric wrapped about the peripheral edge of the first panel so that an outer portion of the first chew guard webbing is located over an outer surface of the first panel contiguous with the periphery thereof, and an inner portion of the first chew guard webbing is located under an inner surface of the first panel contiguous with the periphery thereof. The first chew guard has a pair of end portions which overlap each other in a first overlap zone. The first line of stitches extends through the first chew guard webbing and the first panel to secure the first chew guard webbing to the first panel. The first line of stitches line extends generally parallel to the peripheral edge of the first panel. The second line of stitches extends through the first chew guard webbing and the first panel in the region encompassing the overlap zone and to portions of the webbing contiguous with the first overlap zone. The second line of stitches comprises a double zig-zag pattern having individual stitches each extending at an acute angle to the radius and generally parallel to the direction that dogs use their back molar teeth to gnaw on the first chew guard webbing, whereupon the double zig-zag stitch pattern of the second line of stitches runs parallel to the chewing motion of the dog's back molar teeth to result in a low coefficient of friction therebetween to provide cut and abrasion resistance to the first chew guard webbing at the first overlap zone. The second panel assembly is of a corresponding shape and size to the first panel assembly and is secured to the first panel assembly by a third line of stitches extending generally parallel to the peripheral edge. The soft and resilient stuffing material is located in a space between the first panel assembly and the second panel assembly.

In accordance with one preferred aspect of the chew toy of this invention, the first panel is a quilted panel comprising a first pair of sheets of a high-tenacity woven nylon or polyester bag fabric, with each of the first pair of sheets being same size and shape as the other and being secured to each other by intersecting lines of stitches.

In accordance with another preferred aspect of the chew toy of this invention, the second panel assembly has a predetermined shape having a peripheral edge and a radius extending to the peripheral edge. The second panel assembly is of the same size and shape as the first panel assembly and comprises a second panel, a second chew guard, a fourth line of stitches, and a fifth line of stitches. The second panel includes a second pair of sheets of a high-tenacity woven nylon or polyester bag fabric, each of which is the same size and shape as the other and being secured to each other by intersecting lines of stitches, whereupon the second panel is quilted. The second chew guard comprises a webbing UHMWPE fabric, wrapped about the peripheral edge of the second panel so that an outer portion of the second chew guard is located over an outer surface of the second panel contiguous with the periphery thereof, and an inner portion of the second chew guard is located under an inner surface of the second panel contiguous with the periphery thereof. The second chew guard has a pair of end portions which overlap each other in a second overlap zone. The fourth line of stitches extends through the second chew guard and the second panel to secure the second chew guard to the second panel. The fourth line of stitches line extends generally parallel to the peripheral edge of the second panel. The fifth line of stitches extends through the second chew guard and the second panel in the region encompassing the second overlap zone and to portions of the second chew guard contiguous with the second overlap zone. The fifth line of stitches comprises a double zig-zag pattern having individual stitches extending at an acute angle to the radius and generally parallel to the direction that dogs use their back molar teeth to gnaw on the second chew guard, whereupon the double zig-zag stitch pattern of the fifth line of stitches runs parallel to the chewing motion of the dog's back molar teeth to result in a low coefficient of friction therebetween to provide cut and abrasion resistance to the second chew guard at the second overlap zone.

In accordance with another preferred aspect of the chew toy of this invention, the second line of stitches and the third line of stitches each comprise a thread formed of UHMWPE.

In accordance with another preferred aspect of the chew toy of this invention, the fifth line of stitches comprises a thread formed of UHMWPE.

In accordance with another preferred aspect of the chew toy of this invention, the first panel comprises Cordura® fabric.

In accordance with another preferred aspect of the chew toy of this invention, each of the pair of sheets of the first panel and second panel comprise Cordura® fabric.

In accordance with another preferred aspect of the chew toy of this invention, the soft and resilient stuffing material comprises polyester fiberfill.

In accordance with another preferred aspect of the chew toy of this invention, the chew toy additionally comprising a squeaker device located within the space between the first panel and the second panel.

In accordance with another preferred aspect of the chew toy of this invention, the second and fifth line of stitches are located diametrically opposed to each other.

In accordance with another preferred aspect of the chew toy of this invention, the predetermined shape is circular.

Another aspect of this invention is a method of making a tear-resistant chew toy, comprising:

providing a first panel assembly and a second panel assembly. The first panel assembly comprises a first panel and a first chew guard. The first panel is of a predetermined shape having a peripheral edge and a radius extending to the peripheral edge. The first panel is formed of a high-tenacity woven nylon or polyester bag fabric. The first chew guard comprising a webbing of UHMWPE fabric wrapped about the peripheral edge of the first panel so that an outer portion of the first chew guard is located over an outer surface of the first panel contiguous with the periphery thereof, and an inner portion of the first chew guard is located under an inner surface of the first panel contiguous with the periphery thereof. The first chew guard has a pair of end portions which overlap each other in a first overlap zone. The first chew guard is secured to the first panel by a first line of stitches line extending generally parallel the peripheral edge of the first panel. A second line of stitches is provided extending through the first chew guard webbing and the first panel in the region encompassing the overlap zone and to portions of the webbing contiguous with the first overlap zone. The second line of stitches comprises a double zig-zag pattern having individual stitches each extending at an acute angle to the radius and generally parallel to the direction that dogs use their back molar teeth to gnaw on the first chew guard webbing, whereupon the double zig-zag stitch pattern of the second line of stitches runs parallel to the chewing motion of the dog's back molar teeth to result in a low coefficient of friction therebetween to provide cut and abrasion resistance to the first chew guard webbing at the first overlap zone. The second panel assembly is of a corresponding shape and size to the first panel assembly and is secured to the first panel assembly by third line of stitches extending generally parallel to the peripheral edge. A soft and resilient stuffing material is located in a space between the first panel and the second panel.

In accordance with one preferred aspect of the method of this invention, the first panel is a quilted panel comprising a first pair of sheets of a high-tenacity woven nylon or polyester bag fabric, each of the first pair of sheets being the same size and shape as the other and being secured to each other by intersecting lines of stitches.

In accordance with another preferred aspect of the method of this invention, the second panel assembly is of the predetermined shape and size of the first panel assembly and comprises a second panel, a second chew guard, a fourth line of stitches, and a fifth line of stitches. The second panel has a peripheral edge and a radius extending to the peripheral edge, with the second panel being formed of a high-tenacity woven nylon or polyester bag fabric. The second chew guard comprises a webbing of UHMWPE fabric wrapped about the peripheral edge of the second panel so that an outer portion of the second chew guard is located over an outer surface of the second panel contiguous with the periphery thereof, and an inner portion of the second chew guard is located under an inner surface of the second panel contiguous with the periphery thereof. The second chew guard has a pair of end portions which overlap each other in a second overlap zone. The second chew guard is secured to the second panel by a fourth line of stitches line extending generally parallel the peripheral edge of the second panel. The fifth line of stitches is provided extending through the second chew guard webbing and the second panel in the region encompassing the overlap zone and to portions of the second chew guard contiguous with the second overlap zone. The fifth line of stitches comprises a double zig-zag pattern having individual stitches each extending at an acute angle to the radius and generally parallel to the direction that dogs use their back molar teeth to gnaw on the first chew guard webbing, whereupon the double zig-zag stitch pattern of the fifth line of stitches runs parallel to the chewing motion of the dog's back molar teeth to result in a low coefficient of friction therebetween to provide cut and abrasion resistance to the second chew guard webbing at the second overlap zone;

In accordance with another preferred aspect of the method of this invention, the second panel is a quilted panel comprising a first pair of sheets of a high-tenacity woven nylon or polyester bag fabric, with each of the first pair of sheets being the same size and shape as the other and being secured to each other by intersecting lines of stitches.

In accordance with another preferred aspect of the method of this invention, the second line of stitches and the third line of stitches each comprise a thread formed of UHMWPE.

In accordance with another preferred aspect of the method of this invention, the fifth line of stitches comprises a thread formed of ultra-high molecular weight polyethylene (UHMWPE).

In accordance with another preferred aspect of the method of this invention, the sheets of the first panel and the second panel comprise Cordura® fabric.

BRIEF DESCRIPTION OF SEVERAL VIEWS OF THE DRAWINGS

FIG. 1 is an isometric view of one exemplary embodiment of a tear-resistant chew toy for dogs in accordance with this invention;

FIG. 2 is a transverse sectional view taken along line 2-2 of FIG. 1;

FIG. 3 is a top plan view of the exemplary embodiment of the tear-resistant chew toy for dogs shown in FIG. 1;

FIG. 4 is a bottom plan view of the exemplary embodiment of the tear-resistant chew toy for dogs shown in FIG. 1.

DETAILED DESCRIPTION OF ONE EXEMPLARY PREFERRED EMBODIMENT OF THE INVENTION

Figure 5:
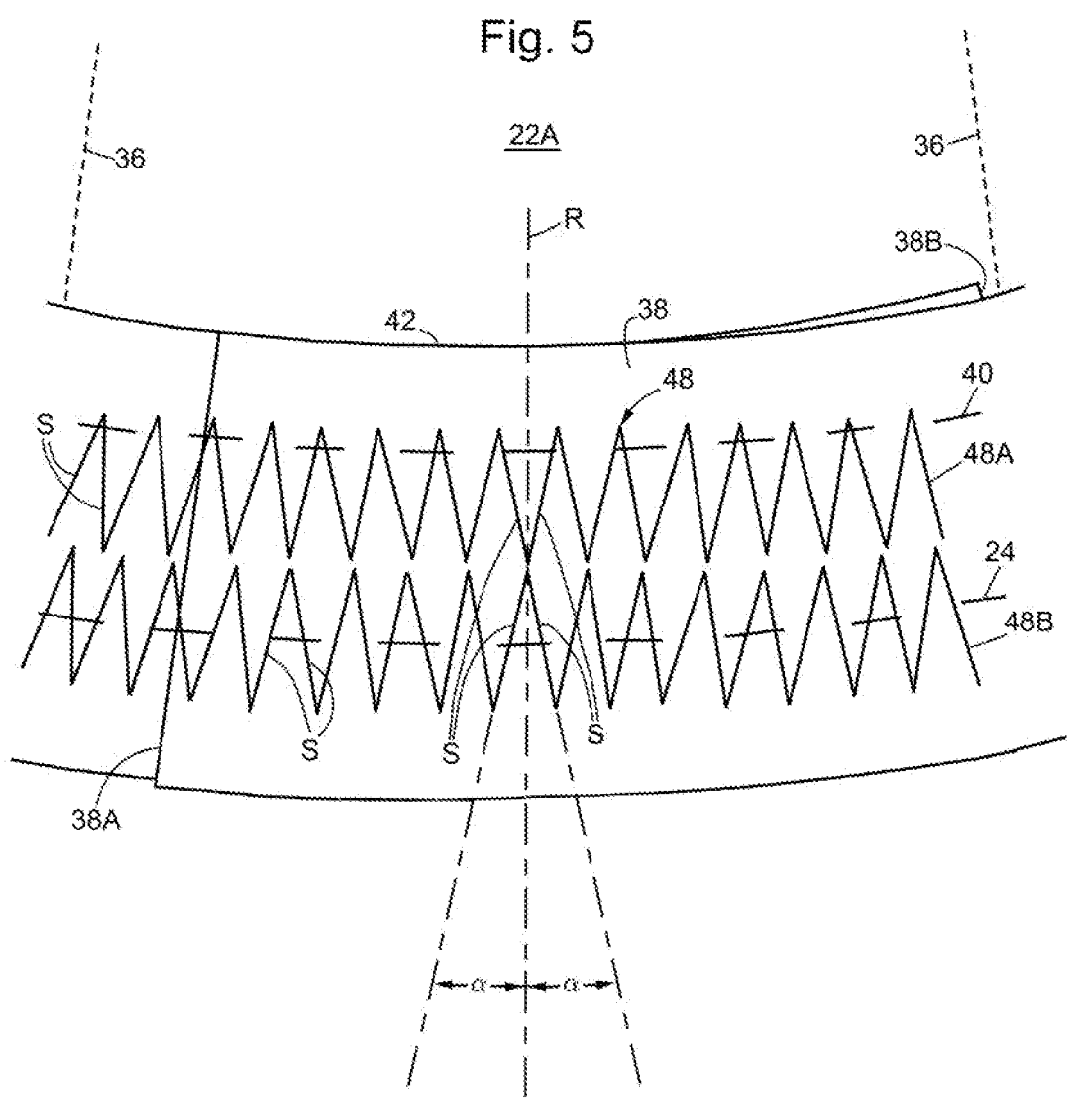
FIG. 5 is a greatly enlarged plan view of a portion of the tear-resistant chew toy of FIG. 1 and, in particular, the overlapping end portions of its chew guard webbing with its associated zig-zagging line of stitches securing those end portions together.

Referring now to the various figures of the drawing wherein like reference characters refer to like parts, there is shown at 20 in FIG. 1 one exemplary embodiment of a tear-resistant chew toy for dogs constructed in accordance with this invention. That embodiment will be described in detail later with reference to the accompanying drawings.

Before doing that, it must be noted that any mention of other potential exemplary embodiments as found in this application are also being provided so that this disclosure will be thorough and will fully convey the scope to those who are skilled in the art. Numerous specific details are set forth such as examples of specific components, devices, and methods, to provide a thorough understanding of the present disclosure. It will be apparent to those skilled in the art that specific details need not be employed, that the exemplary embodiment 20 as will be described later may be embodied in many different forms and that neither should be construed to limit the scope of the disclosure. In some example embodiments, well-known processes, well-known device structures, and well-known technologies are not described in detail.

It should also be noted that the terminology used herein is for the purpose of describing exemplary embodiment(s) only and is not intended to be limiting.

Moreover, as used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. Spatially relative terms, such as "inner," "outer," "beneath" "below" "lower" "above" "upper" and the like may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein are interpreted accordingly.

Turning now to FIG. 1, the plush chew toy 20 basically comprises a first or upper panel assembly or half-section 22A, and a second or lower panel assembly or half-section 22B, which are fixedly secured together by at least one line of stitches 24 extending the periphery of the panel assemblies/half-sections. That configuration results in a hollow interior chamber 26 located between the panel assemblies/half-sections, which chamber is filled with any suitable type of soft or resilient stuffing 28. Preferably a sound emitting device 30, such as a squeaker which emits a squeaking sound when squeezed, is located within the chamber 26 embedded in the stuffing 28. While the use of a sound emitting device is preferred for higher playtime engagement, it is not mandatory.

The panel assemblies/half-sections 22A and 22B are identical in construction. In the interest of brevity, the features of the construction, arrangement, function and operation of the panel assembly/half-section 22A will be now be described, it being understood that the panel assembly/half-section 22B has the same features, so that the common features and components of both panel assemblies/half-sections will be given the same reference numbers and their structure, arrangement, function and operation will only be described with respect to panel assembly/half-section 22A.

The panel assembly/half-section 22A basically comprises a first panel 32, which is in the form of at least one sheet of flexible fabric, but preferably comprises a pair of sheets 32A and 32B. Each sheet 32A and 32B is of a predetermined shape, preferably (but not mandatorily) of circular, e.g., seven (7) inch diameter, or other rounded shape. In the interest of chew-resistance each sheet is formed of high-tenacity woven nylon or polyester bag fabric, such as 1000 D (denier) Cordura® fabric. The two sheets 32A and 32B are fixedly secured together by four perpendicularly intersecting lines of stitches 36 (e.g., four horizontal and four vertical) which extend through both sheets so that the resulting panel 32 is quilted. The lines of stitches are formed by V-69 Nylon thread. As mentioned above, and which will be described in more detail later, various lines of stitches forming a portion of the tear-resistant chew toy of this invention are formed of UHMWPE thread in view of its extremely high strength, yet the lines of stitches 36 forming the quilted panels constitute V-69 Nylon thread. The reason that the toy 20 can make use of that V-69 Nylon thread to produce the quilted panels is because dogs are unable to get as much leverage to tear apart the quilted areas of the toy since the configuration of the toy makes it extremely difficult, if not impossible, for a dog to destroy that part of the toy with their rear jaw (back molars), which is approximately three times stronger in chew strength than the front section of their jaw where their front teeth are situated. Thus, in accordance with one preferred embodiment of this invention the toy can avoid using UHMWPE thread for the quilted portion since Nylon V-69 thread is suitable for this part of the toy and provides cost savings over UHMWPE thread.

As best seen in FIGS. 1-3 a thin (e.g., approximately one (1) inch wide) webbing or strip of fabric forming a chew-guard 38 is wrapped around and folded over the peripheral edge of the panel assembly/half-section 22A, with an outer or upper portion of the chew guard webbing 38 located over an outer surface of the sheet 32A contiguous with the periphery of the sheet 32A, with an inner or lower portion of the chew guard webbing 38 located under an inner surface of the sheet 32B contiguous with the periphery of the sheet 32B. Moreover, as best seen in FIG. 1, one of the ends 38A of the webbing or strip 38 overlaps the opposite end 38B of the webbing or strip 38 in an overlap zone 46. Preferably the overlap zone is of approximately one (1) inch, but can be made longer or shorter, if desired.

A first line of stitches 40 formed of a thread of UHMWPE extends along the entire chew guard webbing 38, including the overlap zone 46, close to the inner edge 42 of the webbing 38 to secure the chew guard 38 about the periphery of the panel assembly/half section 22A. In particular, the line of stitches is formed by sequential stitches which extend through the outer or upper portion of the chew guard webbing 38 close to the inner edge 42 thereof, through the underlying and interposed quilted panel 32, and through the inner or lower portion of the chew guard webbing 38 close to the inner edge 44 thereof. That action fixedly secures the chew-guard webbing 38 onto the periphery of the quilted panel assembly/half-section 22A.

The two quilted panel assembly/half-sections 22A and 22B are fixedly secured to each other by a second line of stitches, namely the previously identified line of stitches 24. That action results in the trapping of the stuffing 28 and the sound emitting squeaker 30 in the chamber 26 located between the two quilted panel assembly/half-sections 22A and 22B. The line of stitches 24 is formed by a thread of ultra-high molecular weight polyethylene that extends through the outer or upper portion of the chew guard webbing 38, the interposed quilted panel 32, the inner or lower portion of the chew guard webbing close to the peripheral edge of the quilted panel assembly/half-section 22A, and through the corresponding portions of the quilted panel assembly/half-section 22B to fixedly secure those two quilted panel assembly/half-sections together.

The use of UHMWPE thread 24 and webbing 38 in combination with the remainder of the toy 20 serves to protect the edge of the toy along the stitched seam from being destroyed when the dog chews on it. In particular, as will be appreciated by those skilled in the art, the use of UHMWPE material in the webbing and thread of the subject invention has many advantages over traditional nylon-based materials being currently used to create a chew guard edge protecting the vulnerable stitched seams in plush dog toys. UHMWPE is incredibly strong with an advertised strength that is approximately fifteen (15) times stronger than steel at an equal weight. Additionally, UHMWPE is extremely cut and abrasion resistant due to its low coefficient of friction. The inherent material properties UHMWPE possesses makes it the ideal choice for creating a durable chew guard designed to protect the edge of plush toys along the stitched seam from being destroyed. UHMWPE thread is also integrated into the design to further enhance the durability the UHMWPE webbing provides the product as a whole and to secure both loose ends of the webbing material that overlap once installation of the chew guard is completed. Traditionally, these loose ends made of nylon during the manufacturing process are melted onto themselves to form one continuous nylon webbing piece using heat. However, UHMWPE is unable to be bonded to itself with heat since it has a lower melting point than most other synthetic materials. That problem is overcome by the subject invention.

To that end, the overlapping ends 38A and 38B of the webbing 38 in the overlap zone 46 and in regions of the webbing contiguous with the overlap zone of the toy 20 are securely sewn together by a unique zig-zagging stitch pattern 48, best seen in FIG. 5, and using UHMWPE thread. As can be seen the stitch pattern 48 basically comprises a double zig-zag arrangement of two rows 48A and 48B of zig-zagging stitches, which rows run parallel to the direction tough dog chewers typically use their back molar teeth to gnaw on and shred apart the chew guard component from side to side. Because the chewing force applied directly to the stitch pattern can only be physically exerted in a side-to-side motion, the stitch pattern runs parallel to the chewing motion which promotes a low coefficient of friction. The low coefficient of friction along this stitch pattern combined with the ultimate strength of the UHMWPE thread material being utilized enables this invention to retain its cut and abrasion resistant edges, ultimately preventing the toy's destruction. In particular, each stitch S extends at an acute angle α, e.g., approximately 15 degrees, with respect to a radius R of the toy's quilted panel assembly/half-section 22A. Thus contiguous stitches S conjoin to form what can be deemed to be a generally V-shaped (or inverted V-shaped) stitch configurations, whose included angle between the stitches S is 2α, e.g., approximately 30 degrees. Since each individual stitch S of the pattern extends at an acute angle α when the dog chews on the edge of the toy, his/her back molars will slide along the stitch S rather than having the effect of cutting laterally across the stitch. As should be appreciated by those skilled in the art, the force of back molars attempting to cut laterally across the stitch rather than to slide along it renders the stitch much more likely to be severed. Accordingly, by minimizing if not eliminating the potential for transverse cutting of the stitch S, the zig-zagging stitch pattern 48 greatly enhances the durability and resistance to damage of the toy.

It should be noted at this juncture that while the stitch pattern 48 shown in FIG. 6 is a preferred pattern, with an exemplary angle α of approximately 15 degrees, and is effective and generally suitable for dogs having various sized and shaped back molars, the angle α could be less or greater than 15 degrees, e.g., as low as approximately 7 degrees and as great as approximately 23 degrees.

In practice, if the toy 20 is sewn manually as opposed to being sewn by computer control, the stitch pattern 48 will unlikely exhibit the precision shown in FIG. 5, and will instead have some variation between the measurements of the angles (in degrees) of each S stitch that makes up the entirety of the stitch pattern 48. In this regard, the stitch pattern 48 is most likely to see the greatest deviation in the angular orientation of each stitch S with respect to the radius R at the beginning of the pattern 48 where the sewing is initially started. The reason is that it is likely that an operator on a sewing machine will tend to feed the webbing fabric through the sewing machine most quickly at the start of the pattern until a consistent sewing rhythm is established in which case the angle of the stitches becomes very consistent. This is particularly true when the sewing operator is using a sewing machine having pedal to control the motor; since the operator is trying to get the sewing job done as quickly and efficiently as possible, they will likely start at a faster rhythm than the steady pace of rhythm utilized to sew together the remainder of the pattern 48. The faster the sewing machine is operated by a person to move the fabric through the machine to create the stitch pattern, the smaller the resulting angles between each stitch S that make up the entirety of the stitch pattern since the high speed of the machine moving forward provides the needle less time to "zig-zag", making the angle of each S stitch at the beginning of the pattern more acute (e.g., a smaller angle α).

In accordance with one preferred aspect of this invention the two quilted panel assembly/half-section 22A and 22B are fixedly secured together so that their respective overlap zones are diametrically opposed to each other, i.e., extend at an angle of one hundred eighty (180) degrees from each other as clearly seen in FIGS. 3 and 4.

The details of the methodology, e.g., steps, for making and assembling the toy 20 will now be described. Step 1: Die cut four (4) congruent circles with a diameter of seven (7) inches from a 1000 D Cordura® fabric sheet to make the panels 32A and 32B for the quilted panel assembly/half-sections 22A and 22B. Step 2: Topstitch (sew) two of the cut-out circles along stitch lines 36 to bind Cordura® fabric together in a quilted pattern. This creates the multi-layered, upper half section 22A. Repeat Step 2 to create the multi-layered, lower half section 22B. Step 3: Wrap a webbing 38 of the UHMWPE webbing around the circumference of the upper half section and folded it over the peripheral edge of the panel so that an outer or upper portion of the webbing 38 is located over an outer surface of the sheet 32A contiguous with the periphery of the sheet 32A, with an inner or lower portion of the webbing 38 located under an inner surface of the sheet 32B contiguous with the periphery of the sheet 32B, and with one of the ends 38A of the webbing 38 overlapping the opposite end 38B of the webbing 38 in an overlap zone 46 of approximately one (1) inch length and then sew the webbing in place on the panel with double needle sewing machine. Care should be taken to leave the approximately one (1) inch overlap of webbing starting where both ends of webbing initially intersect to ensure the successful completion of the next step (i.e., Step 4). Step 4: Sew approximately a two (2) inch long zig-zagging stitch pattern 48 with UHMWPE thread to reinforce the one (1) inch overlap zone 46 of the webbing, whereupon approximately one-half inch of the zig-zagging stitch pattern will extend to either side of the overlap zone. Be sure to align both stitch patterns created on the upper and lower half sections 22A and 22B, respectively, so that the zig-zagging stitch patterns are aligned diametrically opposed to each other, i.e., separated by 180 degrees, before beginning the next step. Step 5: Once the upper and lower half-sections 22A and 22B are aligned as just described, the two half-sections are sewn together along the stitch line 24 extending through the superimposed webbings 38 using a single needle machine. Care should be taken before completing the stitch line 24 to leave enough room of a gap through which the interior chamber 26 can be stuffed with the stuffing 28 and the squeaker 30, with the squeaker being located as close to the center of the chamber as possible. Once the stuffing and squeaker are inserted, finish sewing the toy closed along the stitch line 24 using the single needle sewing machine to yield the final (completed) tear-resistant chew toy 20.

While no tests have been run to determine the efficacy of UHMWPE versus nylon as a material for the purposes of plaque/tartar cleanup and overall dental hygiene, it is possible that the use of the UHMWPE webbing and thread could be better suited than traditional materials for this purpose due to its ultimate strength and favorable biocompatibility. In this regard, UHMWPE's biocompatibility has been demonstrated to be useful in the medical field for several applications including joint replacements and other implants that require a high strength-to-weight ratio.

Without further elaboration the foregoing will so fully illustrate my invention that others may, by applying current or future knowledge, adopt the same for use under various conditions of service.

I claim:

1. A tear-resistant chew toy for a dog having back molar teeth, said tear-resistant chew toy comprising:

a first panel assembly comprising:

a first panel of a predetermined shape having a peripheral edge and a radius extending to said peripheral edge, said first panel being formed of a high-tenacity woven nylon or polyester bag fabric;

a first chew guard comprising a webbing of ultra-high molecular weight polyethylene (UHMWPE) fabric, wrapped about the peripheral edge of said first panel so that an outer portion of said first chew guard is located over an outer surface of said first panel contiguous with the peripheral edge, and an inner portion of said first chew guard is located under an inner surface of said first panel contiguous with the peripheral edge, said first chew guard having a pair of end portions which overlap each other in a first overlap zone;

a first line of stitches extending through said first chew guard and said first panel to secure said first chew guard to said first panel, said first line of stitches line extending generally parallel said peripheral edge of said first panel;

a second line of stitches extending through said first chew guard and said first panel in the region encompassing said first overlap zone and to portions of said webbing contiguous with said first overlap zone, said second line of stitches comprising a double zig-zag pattern having individual stitches each extending at an acute angle to said radius and generally parallel to the direction that dogs use their back molar teeth to gnaw on said first chew guard webbing, whereupon said double zig-zag pattern of said second line of stitches runs parallel to a chewing motion of the dog's back molar teeth on the tear-resistant chew toy to result in a low coefficient of friction therebetween to provide cut and abrasion resistance to said first chew guard webbing at said first overlap zone;

a second panel assembly of a corresponding shape and size to said first panel assembly, and secured to said first panel assembly by a third line of stitches extending generally parallel to said peripheral edge; and a soft and resilient stuffing material located in a space between said first panel assembly and said second panel assembly.

2. The tear-resistant chew toy of claim 1, wherein said first panel is a quilted panel comprising a first pair of sheets of a high-tenacity woven nylon or polyester bag fabric, each of said first pair of sheets being same size and shape as the other and being secured to each other by intersecting lines of stitches.

3. The tear-resistant chew toy of claim 1, wherein said second panel assembly has a predetermined shape having a peripheral edge and a radius extending to said peripheral edge, said second panel assembly being of a same size and shape as said first panel assembly and comprising:

a second panel including a second pair of sheets of a high-tenacity woven nylon or polyester bag fabric, each of which is the same size and shape as the other and being secured to each other by intersecting lines of stitches, whereupon said second panel is quilted;

a second chew guard comprises a webbing of UHMWPE fabric, wrapped about the peripheral edge of said second panel so that an outer portion of said second chew guard is located over an outer surface of said second panel contiguous with the peripheral edge of said second panel, and an inner portion of said second chew guard is located under an inner surface of said second panel contiguous with the peripheral edge of said second panel, said second chew guard having a pair of end portions which overlap each other in a second overlap zone; and a fourth line of stitches extending through said second chew guard and said second panel to secure said second chew guard to said second panel, said fourth line of stitches line extending generally parallel said peripheral edge of said second panel; and a fifth line of stitches extending through said second chew guard and said second panel in the region encompassing said second overlap zone and to portions of said second chew guard contiguous with said second overlap zone, said fifth line of stitches comprising a double zig-zag pattern having individual stitches extending at an acute angle to the radius and generally parallel to the direction that dogs use their back molar teeth to gnaw on said second chew guard, whereupon said double zig-zag pattern of said fifth line of stitches runs parallel to the chewing motion of the dog's back molar teeth to result in a low coefficient of friction therebetween to provide cut and abrasion resistance to said second chew guard at said second overlap zone.

4. The tear-resistant chew toy of claim 1, wherein said second line of stitches and said third line of stitches each comprise a thread formed of UHMWPE.

5. The tear-resistant chew toy of claim 4, wherein said fifth line of stitches comprises a thread formed of UHMWPE.

6. The tear-resistant chew toy of claim 1, wherein said first panel comprises 1000 denier high-tenacity woven nylon or polyester bag fabric.

7. The tear-resistant chew toy of claim 2, wherein each of said pair of sheets of said first panel comprises 1000 denier high-tenacity woven nylon or polyester bag fabric.

8. The tear-resistant chew toy of claim 3, wherein each of said pair of sheets of said first panel and said second panel comprises 1000 denier high-tenacity woven nylon or polyester bag fabric.

9. The tear-resistant chew toy of claim 1, wherein said soft and resilient stuffing material comprises polyester fiberfill.

10. The tear-resistant chew toy of claim 1, additionally comprising a squeaker device located within said space between said first panel and said second panel.

11. The tear-resistant chew toy of claim 9, additionally comprising a squeaker device located within said space between said first panel and said second panel.

12. The tear-resistant chew toy of claim 3, wherein with said second and fifth line of stitches are located diametrically opposed to each other.

13. The tear-resistant chew toy of claim 1, wherein said predetermined shape is circular.

14. A method of making a tear-resistant chew toy, comprising:

providing a first panel assembly comprising:

a first panel of a predetermined shape having a peripheral edge and a radius extending to said peripheral edge, said first panel being formed of a high-tenacity woven nylon or polyester bag fabric;

a first chew guard comprising a webbing of UHMWPE fabric wrapped about the peripheral edge of said first panel so that an outer portion of said first chew guard is located over an outer surface of said first panel contiguous with the peripheral edge, and an inner portion of said first chew guard is located under an inner surface of said first panel contiguous with the peripheral edge, said first chew guard having a pair of end portions which overlap each other in a first overlap zone;

securing said first chew guard webbing to said first panel by a first line of stitches line extending generally parallel said peripheral edge of said first panel;

providing a second line of stitches extending through said first chew guard webbing and said first panel in the region encompassing said first overlap zone and to portions of said webbing contiguous with said first overlap zone, said second line of stitches comprising a double zig-zag pattern having individual stitches each extending at an acute angle to said radius and generally parallel to the direction that dogs use their back molar teeth to gnaw on said first chew guard webbing, whereupon said double zig-zag pattern of said second line of stitches runs parallel to a chewing motion of the dog's back molar teeth on the tear-resistant chew toy to result in a low coefficient of friction therebetween to provide cut and abrasion resistance to said first chew guard webbing at said first overlap zone;

providing a second panel assembly of a corresponding shape and size to said first panel assembly;

securing said second panel assembly to said first panel assembly by third line of stitches extending generally parallel to said peripheral edge; and inserting a soft and resilient stuffing material located in a space between said first panel and said second panel.

15. The method of claim 14, wherein said first panel is a quilted panel comprising a first pair of sheets of a high-tenacity woven nylon or polyester bag fabric, each of said first pair of sheets being same size and shape as the other and being secured to each other by intersecting lines of stitches.

16. The method of claim 14, wherein said second panel assembly is of said predetermined shape and size of said first panel assembly and comprises:

a second panel having a peripheral edge and a radius extending to said peripheral edge, said second panel being formed of a high-tenacity woven nylon or polyester bag fabric;

a second chew guard comprising a webbing of UHMWPE fabric wrapped about the peripheral edge of said second panel so that an outer portion of said second chew guard is located over an outer surface of said second panel contiguous with the peripheral edge of said second panel, and an inner portion of said second chew guard is located under an inner surface of said second panel contiguous with the peripheral edge of said second panel, said second chew guard having a pair of end portions which overlap each other in a second overlap zone;

securing said second chew guard webbing to said second panel by a fourth line of stitches line extending generally parallel said peripheral edge of said second panel; and providing a fifth line of stitches extending through said second chew guard and said second panel in the region encompassing said overlap zone and to portions of said second chew guard contiguous with said second overlap zone, said fifth line of stitches comprising a double zig-zag pattern having individual stitches each extending at an acute angle to said radius and generally parallel to the direction that dogs use their back molar teeth to gnaw on said second chew guard, whereupon said double zig-zag pattern of said fifth line of stitches runs parallel to the chewing motion of the dog's back molar teeth to result in a low coefficient of friction therebetween to provide cut and abrasion resistance to said second chew guard at said first overlap zone.

17. The method of claim 16 wherein said second panel is a quilted panel comprising a first pair of sheets of a high-tenacity woven nylon or polyester bag fabric, each of said first pair of sheets being same size and shape as the other and being secured to each other by intersecting lines of stitches.

18. The method of claim 14, wherein said second line of stitches and said third line of stitches each comprise a thread formed of UHMWPE.

19. The method of claim 18, wherein said fifth line of stitches comprises a thread formed of UHMWPE.

20. The method of claim 16, wherein said sheets of said first panel and said second panel comprise 1000 denier high-tenacity woven nylon or polyester bag fabric.

* * * * *